United States Patent Office 3,247,276
Patented Apr. 19, 1966

3,247,276
CATALYTIC TREATMENT OF HYDROCARBONS
Edward T. Child, Fishkill, Robert J. Leak, Wappingers Falls, and Howard V. Hess, Glenham, N.Y., assignors to Texaco Inc., New York, N.Y., a corporation of Delaware
No Drawing. Filed July 9, 1962, Ser. No. 208,621
4 Claims. (Cl. 260—673)

This invention relates to the catalytic treatment of hydrocarbons and, more particularly, to the aromatization and dehydrogenation of hydrocarbons in the presence of an improved catalyst.

During catalytic processing with solid particulate catalysts, the reactants are passed through a bed of porous catalyst particles, beads or pellets. In many such reactions employing organic materials at elevated temperatures, a carbonaceous deposit accumulates on the catalyst surface and in the pores and openings of the catalyst as the process proceeds under continuous operating conditions. This deposition of carbonaceous material, commonly known as fouling of the catalyst, is a function of the reactants, the reaction products, the conditions of the process, and the catalyst, and certain types of reactions may be worse offenders than others. Fouling may be particularly excessive when the reactants or product remain in contact with the catalyst for a relatively long time. When a porous catalyst is used, the reactants diffuse into the interior or central portion of the catalyst particles and may be retained for an excessive period of time whereupon decomposition of the reactants and products result in fouling the catalyst. Fouling results not only in a decrease in catalyst activity and loss in selectivity, but also results in intensification of the heat transfer problem in the catalyst thereby resulting in local overheating or "hot spots," particularly during regeneration of the catalyst.

This invention has therefore as its object to provide an improved catalytic structure devoid of the foregoing disadvantages and suitable for use in the aromatization and dehydrogenation of a hydrocarbon and characterized by relatively high activity over long periods of use.

Heat transfer and temperature control in a catalyst bed often are difficult problems by reason of the heat of reaction which accompanies the catalytic reactions. Thus, in an exothermic reaction, for example, the heat evolved in processing may result in formation of local overheating or "hot spots" unless distributed substantially uniformly throughout the catalyst bed or otherwise dissipated from the reaction zone. Generally it is desirable or essential, to maintain the reaction temperature within a predetermined range in order to obtain the maximum yield of desired products. Local overheating and temperature variations in the catalyst bed are therefore deleterious and may result in excessive coking of the reactants, inactivation of the catalyst, or otherwise cause undesired side reactions.

The catalyst bed, customarily provided in a composite form comprising an active component supported by a carrier, is generally a relatively poor conductor of heat. Temperature control may be particularly difficult in a conventional packed column or fixed bed reactor where each layer of catalyst is, in effect, partially insulated from adjacent layers. Heat carriers or heat conductive materials have been proposed as one means of reducing temperature gradients in a catalyst bed. For carrying out some highly exothermic or highly endothermic reactions, it has been proposed to incorporate pieces of metal or other suitable heat conductive solid material in the fixed catalyst bed to facilitate heat transfer to the surroundings. Heat transfer and temperature control of the catalyst bed have been achieved by employing a gaseous or liquid heat-transfer medium usually circulated through a jacket surrounding the reactor. The reactants may be diluted with steam or an inert gas as a further means of achieving temperature control. However, the known or proposed methods regarding thermal control necessitate especially designed reactors, and further may require materials and equipment in addition to that normally employed.

In certain processing operations, the temperature may be controlled within the desired range by employing low flow rates or low conversion levels to limit the rate of heat released by the reaction. However, this normally results in a corresponding decrease in yield per unit of time. Notwithstanding this precaution, uncontrollable local overheating and temperature variations in the catalyst bed may occur.

This invention has as another object to provide a catalyst structure which affords an effective means for adequately controlling the thermal conditions of the reaction thereby minimizing, or substantially eliminating, temperature variations in the catalyst bed and local overheating and fouling. Equally important, our catalytic structure is not restricted to any particular configuration, and may comprise the walls of the reactor thereby obviating the need for employing a packed column of catalyst. As a result, the quantity of active catalyst material used in our catalytic structure is greatly reduced as compared to the quantity required in conventional structures. This eliminates a substantial portion of the structural and supporting members of the reactor, permits compactness in design and decreases substantially the capital costs and operating costs. It is significant that the foregoing and other objects are realized without diminishing the flow rates of the reactants, but on the contrary, the reaction rates may be greatly increased without any appreciable decrease in product yield. These together with other objects and advantages will be apparent to one skilled in the art upon reading the following description.

The novel catalytic structure of our invention for use in the aromatization and dehydrogenation of a hydrocarbon involves broadly a substrate, preferably of extended dimensions, having an adherent film or layer of alumina formed thereon. The film of alumina deposited or formed on the substrate is sufficiently tenacious to withstand ordinary usage and is not damaged or impaired upon relatively severe abrading, jarring, etc. A catalyst comprising the oxides of potassium, cerium and chromium is deposited upon the film of alumina adhering to the substrate, as explained more fully hereinbelow. Our invention was found to be extremely advantageous and economical for use in aromatization and dehydrogenation of hydrocarbons, and by reason of the improvement these processes may be conducted at atmospheric pressure and over relatively long periods of use without any significant deposition of carbonaceous material on the catalyst. It is understood that the operating conditions such as temperature and residence time for these catalytic reactions may vary over a wide range, and are dependent to a large extent upon the composition of the feed and the end products sought.

In accordance with this invention, the substrate employed in the catalytic structure is provided with an adherent film of alumina formed by contacting the substrate with a solution of an alkali metal aluminate, e.g., sodium aluminate. The substrate is preferably of extended dimensions, and is particularly of a length and geometric surface area substantially greater than that of discrete particles. The substrate employed in the structure of our invention is not restricted to any particular configuration nor to any particular material. The substrate may be formed of a metal or non-metal suitable for use in a catalytic reactor, and may include such materials as steel, stainless steel, nickel, or titanium, including sintered metal materials, or refractory or ceramic materials including, for example, high melting glass, refractory metal oxides, e.g., magnesia and silica, or refractory metal silicates or carbides. The configuration of the substrate may include bars, balls, chain, mesh, plates, saddles, sheet, tubes, wire and the like.

Although the invention is described herein in detail with reference to employing a sodium aluminate solution, it should be understood that a solution of potassium aluminate is also satisfactory for use in forming an adherent film of alumina on the substrate.

In preparing the catalytic structure, the substrate is contacted with an aqueous solution of sodium aluminate whereby an adherent film of alumina is formed thereon, the resulting film being hard, firm and tenacious. X-ray diffraction analysis indicates that the alumina formed or deposited from the sodium aluminate solution is chiefly the trihydrate phase, either as the alpha or beta trihydrate phase. The particular phase initially deposited onto the substrate appears to be largely dependent on the temperature of the sodium aluminate solution employed. Thus, solutions at about room temperature result in the formation of a film comprising about 50% by weight alpha alumina trihydrate and 50% by weight beta alumina trihydrate; whereas, employing sodium aluminate solutions at elevated temperature, e.g., 125° F. or higher, generally results in a film comprising alpha alumina trihydrate. The phase of hydrated alumina formed on the substrate may be significant in that further transformation of the alumina may be effected where desired, upon dehydration on heating or mild calcination, as explained below in detail. However, the alumina film formed on the substrate may contain a small quantity of some other phase or phases of alumina, as well as several tenths percent sodium oxide (which may be present as sodium aluminate). It should be understood, however, that the alumina film initially deposited on the substrate may be regarded as substantially a hydrate of alumina, and is intended to embrace the film formed on the substrate from a solution of sodium aluminate, which film may undergo additional phase transformation.

The sodium aluminate solution may be obtained or prepared by any known methods. Thus, for example, aluminum pellets may be dissolved in a relatively strong solution of sodium hydroxide, or, where deemed desirable, alumina may be dissolved in an aqueous solution of sodium hydroxide. The substrate is contacted with the resulting solution of sodium aluminate, and for a sufficient period of time, whereby an adherent film of alumina is formed on the surface of the substrate. Generally, the concentration of the sodium aluminate solution should not be less than 0.5 molar, and more preferably 1 molar, in order for a film of alumina deposited or formed be of sufficient depth to be serviceable and be formed within a reasonable period of time. Generally, a solution having a concentration of about 1 to 5 molar is satisfactory. Where desired, more concentrated solutions may be employed but there appears to be no advantage in employing solutions having concentration greater than 30 molar. Although a solution of sodium aluminate at room temperature may be used, formation of the alumina film is somewhat facilitated by contacting the substrate with a solution of sodium aluminate maintained at an elevated temperature. However, as explained above, the temperature of the solution determines to a considerable extent the particular alumina phase formed. Thus, for example, in depositing a film of alpha alumina trihydrate on the substrate it is desirable to employ a solution having a temperature above 125° F., and more preferably about 175 to 212° F.

The substrate may be contacted with the solution of sodium aluminate as by immersing the substrate when in particulate form, e.g., saddles, spheres, mesh, etc., in the solution; or in forming the alumina film on the interior wall of a tube of substantial length, sodium aluminate solution is added to the tube and permitted to stand therein in a vertical position in order to provide for a film of uniform thickness. The resulting film of alumina formed on the substrate should be of sufficient thickness to provide adequate capacity for retaining the catalyst deposited thereon. To insure adequate performance under the conditions encountered in catalytic processing, however, the film of alumina formed should not be substantially thinner than about 1 mil, and preferably not less than about 10 mils, usually 10 to 100 mils being desirable.

In the preferred embodiment of this invention, the alumina in hydrate form deposited on the substrate as an adherent film is subjected to heating to drive off at least part of the water of hydration thereby resulting in the transformation to a lower state, or degree, of hydration and also to a higher density alumina. Such transformation accompanying heating is well known in the art, and may be found discussed in "Alumina Properties" by J. W. Newsome et al. (Aluminum Company of America, 1960, Second Revision). The temperature required in effecting transformation of the hydrate of alumina depends on such factors as pressure, atmosphere, heating rate and impurities. Thus, for example, both alpha alumina trihydrate and beta alumina trihydrate deposited from a solution of sodium aluminate, as explained above, may be dehydrated to the monohydrate phase upon mild calcining in an atmosphere of air to about 390 to 750° F. and at slightly elevated pressure. The resulting monohydrate phase may be subjected to further heating to about 1000 to 1500° F. thereby transforming it to the gamma phase. On the other hand, beta alumina trihydrate may be transferred to eta alumina upon heating in dry air at a slow rate to about 550 to 950° F. Transformation to gamma alumina or eta alumina is particularly advantageous in that these phases have a large total surface area per unit weight, the surface area being substantially higher than the amorphous forms of alumina, thereby increasing the catalytic activity, per se, and, more importantly, resulting in a carrier characterized by a high adsorptive property.

The catalyst comprising the oxides of potassium, cerium and chromium for aromatization and dehydrogenation may be deposited or formed on the alumina film by impregnation of the alumina film. This is accomplished by contacting the alumina coated substrate with a catalyst-containing material, generally by immersing the alumina coated substrate in a solution of a compound or salt of the catalyst. Compounds or salts found particularly useful and convenient include the water-soluble compounds such as nitrates, sulfates, chlorides, oxides and the like. A solution of the catalyst material may be prepared by dissolving in water the required amounts of compounds of potassium, cerium and chromium; and, upon immersion of the alumina coated substrate in the solution, catalyst-containing material is co-deposited onto the alumina film. Where desired, however, a separate solution for each catalyst material may be prepared, and deposition formed successively on the alumina film. The temperature of the solution, or solutions, employed usually is at about room temperature, and may range from about 40 to 200° F., and preferably from 50 to 100° F.

The alumina coated substrate having a deposit thereon comprising an intimate mixture of the compounds of potassium, cerium and chromium is calcined to stabilize the structure for use in catalytic reactions and to convert all the metal compounds to their corresponding oxides. For this purpose, the impregnated alumina film may be calcined in air at a temperature from about 500 to 1400° F., and preferably from 900 to 1200° F., for a period of time of about 1 to 24 hours. However, to stabilize the structure for use in catalytic reactions, the temperature employed in calcining should be at least as high as that used in the anticipated catalytic reaction, and calcining is for a sufficient period of time to convert substantially all of the metals to their corresponding oxides. Where required, the impregnation step and calcining operation may be repeated to assure an adequate deposit of catalyst. It will be observed that the amount of catalyst deposited on the alumina film may be varied over a large range, and will depend largely upon the amount required in the final catalytic structure. The relative amounts of the oxides of potassium, cerium and chromium employed in the catalytic structure will depend primarily upon the catalytic reaction for which the catalytic structure is employed. However, chromium oxide is the predominant component, and usually comprises about 75 to 90 percent by weight of the total of the said metal oxides. In the catalytic structure, we have found it particularly desirable to employ these metal oxides and the alumina in the ranges, of percent by weight, of about 1 to 5% potassium oxide, 0.5 to 3% cerium and 10 to 30% chromium oxide, the balance being alumina.

Referring now in greater detail to the catalytic structure of our invention, and the attendant advantages, the substrate is initially provided with an alumina film which is relatively thin as compared to the substrate. The substrate is not restricted to any particular configuration, and may include bars, balls, chains, plates, saddles, sheet, tubes, wire, mesh, shavings, fibers, or the like, the member of the substrate preferably of extended dimensions desirably not less than about $\frac{1}{16}$ inch in its maximum dimension, and of sufficient thickness on which the alumina film may be adequately produced. Generally, an alumina film of about 10 to 100 mils is sufficient, but thicker or thinner film may be employed where desired. The thin alumina film with the added catalyst material defines the depth of the catalyst bed, and therefore limits the extent of diffusion of the reactants through the pores and openings in the bed to this shallow depth. As a consequence, substantially all of the catalyst material is exposed to the reactants, and entrapment of the reactants in the catalyst is minimized or substantially eliminated whereby fouling is substantially reduced. In this manner, we readily achieve with less catalyst material a reactive capacity equal to, or greater than, that accomplished by conventional catalysts.

In a preferred embodiment of this invention, a metal is employed as the substrate of the catalytic structure thereby rendering the structure capable of operating under substantially isothermal conditions. During the catalytic process, heat transfer in the catalyst bed is accomplished by means of the metal substrate, which is preferably of extended dimensions. Depending on the nature of the reaction, heat may be extracted from, or supplied to, the reactor through the metal substrate thereby providing an adequate means for controlling temperature conditions in the catalyst bed. Thus, in an exothermic process, for example, the metal substrate will conduct the heat to the surroundings of the reactor, and the excess heat extracted therefrom preferably by means of a cooling medium employed in heat exchange relation with the reactor.

In another embodiment of our invention, the catalytic structure is provided in the form of a tube of relatively small inside diameter. The inside diameter of the tube, in general, may range from about 0.05 to 0.75 inch, and in some cases up to 2 inches, but is dependent upon the type of catalytic reaction, materials undergoing reaction and the capacity of the pumping mechanism to accomplish sufficient turbulence. At least one surface or wall of the tube, and preferably the interior wall of the tube, is provided with an alumina film as described above, and preferably added catalyst material is deposited thereon. The tube through which the reactants pass is preferably of a continuous length sufficient to accomplish the desired catalytic reaction in economic yields, but may be coiled to conserve space. The length of the tube may depend to some extent upon the reaction contemplated, and therefore may be readily determined by one skilled in the art. The wall of the reactor provides adequate support and mechanical strength for the catalyst, and thereby affords a substantially self-sustaining structure. Packed reaction columns are eliminated as are many of the structural and supporting features employed in a conventional catalytic reactor.

It will be observed that when a metal tube is employed, the tube provides an adequate means to control the temperature or heat transfer to or from the catalyst. The metal wall, being a good heat conductor, may be employed as a heat exchanger notwithstanding the relatively thin alumina film. A suitable heat exchange medium may be applied to the exterior wall of the metal tube, for example. During processing, the heat evolved in the catalyst bed is readily conducted by the wall of the tube to the surroundings where it is absorbed and dissipated by the heat exchange medium. On the other hand, the tubular wall may be employed for supplying heat from a heating medium in the case of an endothermic reaction. It should be understood that in an economic and commercial operation, a number of the catalytic tubes may be housed in parallel in a single unit and arranged in contacting relation with a heat exchange medium.

It is of further significance that in the catalytic tube having a relatively small inside diameter, turbulent flow of the reactants passing through the tube is readily maintained. As a consequence, near maximum reaction rates are achieved. In addition, the catalytic structure of our invention markedly reduces the residence time of the reactants in the reactor, as expalined above. Consequently, the reactor may be operated at high temperatures, or optimum temperatures, or more importantly, in many cases at higher temperatures and faster reaction rates than those normally encountered in a conventional reactor, without danger of excessive coking or fouling of the catalyst.

The following examples will further illustrate our invention:

*Example I*

A sodium aluminate solution was prepared by dissolving 293 grams of sodium hydroxide in 5 liters of water contained in a battery jar, and adding thereto 192 grams of aluminum pills. 250 grams of chrome steel chips measuring $\frac{1}{8}''$ x $\frac{1}{4}''$ were retained in a stainless steel sieve which was immersed in the solution. The solution was maintained at 180° F. by means of a steam plate for about 2 hours. The battery jar was removed from the steam plate, and the solution allowed to stand until a precipitate began to form on the side walls and bottom of the battery jar. The chips retained in the sieve were then agitated by shaking about every ½ hour over a 3 hour period and then permitted to remain in the solution for 15 hours in order that the chips might be uniformly coated. The chips were then removed from the soultion, and washed thoroughly with tap water and then with distilled water. The chips having an adherent film of alumina formed thereon were dried gradually to avoid cracking, first at 250° F. for 2 hours, then at 750° F. for 16 hours and finally at 1000° F. for 1 hour. As a result of the heating, the alumina film comprised essentially gamma alumina. The total weight of the coated chips was 286 grams, the alumina film comprising 12.2 percent of the total weight.

A catalyst-containing solution was prepared by dissolving 1.8 grams of potassium nitrate, 2.0 grams of cerium nitrate hexahydrate and 8.1 grams of chromic oxide in 27 milliliters of water. The chrome steel chips having the alumina film formed thereon were immersed in the resulting solution for a sufficient period of time whereby substantially all the solution was absorbed by the alumina film. The impregnated chips were then dried in air at 250° F. for ½ hour, then 500° F. for ½ hour and finally at 1000° F. for 2 hours.

The prepared catalyst material was used in the aromatization of 1-butene by passing the olefin charge through the catalyst at atmospheric pressure, at a temperature of 1200° F., and at a liquid space velocity of 1.8 v./v./hr. The liquid product recovery was 44 grams per 100 grams of charge thereby showing excellent catalytic activity. The distillation range for the product recovery, and an analysis of the product, are set forth in the table below:

TABLE

| Boiling Point of Fraction, ° F. | Aromatics, Percent by Volume | Olefins, Percent by Volume |
|---|---|---|
| 82–100 | | |
| 100–200 | | 41 |
| 200–300 | 59 | 27 |
| 300–396 | 73 | 6 |
| Residue | 94 | |

Example II

The catalyst material employed as in Example I was employed in the aromatization of a mixed butane-butene refinery stream from a fluid catalytic cracking unit containing 37.2 mole percent butane and 45.8 mole percent butene. The process was conducted at 1200° F., at atmospheric pressure and a liquid hourly space velocity of 1.0. About 15 wt. percent of the charge was converted to a liquid product which was nearly completely aromatic comprising benzene, toluene, xylenes, naphthalenes and other heavier aromatics.

It is significant that the run was conducted at atmospheric pressure and further that no diluent was employed. The run was on-stream for 30 hours before there was any indication of carbonaceous formation on the catalytic structure. This compares favorably with a known process employing catalyst supported on alumina pellets which is conducted under reduced pressures (about 5 inches of mercury absolute pressure) and require frequent regeneration.

Example III

The catalyst material of Example I was used in the dehydrogenation of 1-butene to 1,3-butadiene. Nitrogen was employed as a diluent such that the feed charge was diluted with about 80 to 91% by volume nitrogen. The reaction was conducted at 1097° F., at atmospheric pressure and at a liquid space velocity of 0.2 v./v./hr. 17.8% by weight of 1,3-butadiene was recovered in the gas phase.

Example IV

Using the catalyst structure as prepared in Example I, an untreated refinery pentane-pentene stream from a fluid catalytic cracking unit containing 29.6 weight percent of isopentane and 28.7 weight percent of isopentene was employed in the preparation of isoprene. The run was conducted at 1200° F., at atmospheric pressure, and at a liquid hourly space velocity of 2. A $C_5$ cut, which comprised about 65 weight percent of the liquid product of a 90 percent liquid yield, contained 5.7 weight percent isoprene. The liquid product contained 31.4 weight percent isopentane and 33.7 weight percent isopentene. This compares favorably with a known dehydrogenation process which, in order to increase the yield, employs a feed which has been prefractionated to concentrate the isopentane and isopentene, employs reduced pressures which favors the formation of isoprene and recycles the unreacted charge.

Having described the present invention, we claim:

1. In a process for the catalytic treatment of hydrocarbons selected from the group consisting of four and five carbon atom paraffins and olefins at an elevated temperature, the improvement which comprises contacting said hydrocarbons in a reaction zone with a catalytic structure comprising an extended surface chrome steel support, an adherent film of alumina formed on said support by contacting said support with an aqueous solution of an alkali metal aluminate having a concentration of not less than 0.5 molar and subsequently heating said resulting film of alumina to effect transformation of said resulting alumina film to a lower state of hydration, and having deposited on said alumina film oxides of potassium, cerium and chromium.

2. A process according to claim 1 wherein the ranges, in weight percent, of said oxides are 1 to 5% potassium oxide, 0.5 to 3% cerium oxide and 10 to 30% chromium oxide, the balance being alumina.

3. A process according to claim 1 wherein a butane-butene feed stock is treated at aromatization temperature and cyclic hydrocarbons are recovered from the effluent of said reaction zone.

4. A process according to claim 1 wherein a feed stock comprising 1-butene is treated at dehydrogenation temperature and 1,3-butadiene is recovered from the effluent of said reaction zone.

References Cited by the Examiner

UNITED STATES PATENTS

| | | | |
|---|---|---|---|
| 1,868,127 | 7/1932 | Winkler et al. | 260—673 |
| 1,945,960 | 2/1934 | Winkler et al. | 260—673 |
| 1,987,092 | 1/1935 | Winkler et al. | 260—673 |
| 1,988,873 | 1/1935 | Linckh et al. | 260—673 |
| 2,461,147 | 2/1949 | Davies et al. | 260—680 |
| 2,730,434 | 1/1956 | Houdry | 252—477 |
| 2,965,583 | 12/1960 | Houdry et al. | 252—465 |
| 3,027,413 | 3/1962 | Moy et al. | 260—673 |
| 3,155,627 | 11/1964 | Cole et al. | 252—477 |

ALPHONSO D. SULLIVAN, *Primary Examiner.*

JOSEPH R. LIBERMAN, *Examiner.*